United States Patent
Nixon et al.

(10) Patent No.: US 11,047,967 B2
(45) Date of Patent: Jun. 29, 2021

(54) REMOVAL OF DIRECTWAVE HIGH FREQUENCY SIGNAL FOR IONOSPHERIC SOUNDER RETURN PROCESSING

(71) Applicant: Southwest Research Institute, San Antonio, TX (US)

(72) Inventors: James H. Nixon, Helotes, TX (US); Brock A. Martin, Helotes, TX (US); John J. Signorotti, Fair Oaks Ranch, TX (US); Robert G. Fenske, Jr., San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 273 days.

(21) Appl. No.: 16/033,740

(22) Filed: Jul. 12, 2018

(65) Prior Publication Data

US 2020/0018841 A1 Jan. 16, 2020

(51) Int. Cl.
*G01S 13/02* (2006.01)
*G01S 19/07* (2010.01)

(52) U.S. Cl.
CPC .......... *G01S 13/0218* (2013.01); *G01S 19/07* (2013.01)

(58) Field of Classification Search
CPC .............................. G01S 13/0218; G01S 19/07
USPC .......................................................... 342/82
See application file for complete search history.

(56) References Cited

U.S. PATENT DOCUMENTS 4,554,546 A * 11/1985 Herbreteau ............. G01S 7/352
342/26 D
5,160,932 A * 11/1992 Bull ..................... G01S 13/9029
342/25 B
5,230,076 A * 7/1993 Wilkinson ........... H04B 17/309
375/133
5,486,833 A * 1/1996 Barrett .................... G01S 7/414
342/204
5,543,806 A * 8/1996 Wilkinson ........... H01Q 3/2605
342/368

(Continued)

FOREIGN PATENT DOCUMENTS

EP 0946920 B1 * 3/2005 ......... H04B 7/18519

OTHER PUBLICATIONS

Wei Xia et al."A noise-constrained distributed adaptive direct position determination algorithm" Signal Processing 135 (2017) 9-16 (Year: 2017).*

(Continued)

*Primary Examiner* — Peter M Bythrow
*Assistant Examiner* — Alexander L. Syrkin
(74) *Attorney, Agent, or Firm* — Livingston Law Firm

(57) ABSTRACT

A method of operating a vertical incidence sounder. The sounder transmits a random modulated sounder signal, and receives a return signal, comprising a directwave component and a reflected component. A first cross-ambiguity process between the transmitted signal and the return signal is used to time and frequency align the return signal with the transmitted signal. The direct wave signal is removed, thereby producing a processed return signal. A second cross-ambiguity process between the transmitted signal and the processed return signal is performed to determine a time offset, which is used to estimate an ionospheric height.

8 Claims, 4 Drawing Sheets

(56) References Cited

U.S. PATENT DOCUMENTS

| | | | | |
|---|---|---|---|---|
| 5,943,629 | A * | 8/1999 | Ballard | H04L 1/24 |
| | | | | 702/2 |
| 6,538,597 | B1 * | 3/2003 | Steudel | G01S 7/2813 |
| | | | | 342/13 |
| 8,747,321 | B2 * | 6/2014 | Sankar | H03K 7/00 |
| | | | | 600/443 |
| 10,578,748 | B2 * | 3/2020 | Paek | G01S 19/44 |
| 2002/0101917 | A1 * | 8/2002 | Bibl | G01S 13/582 |
| | | | | 375/224 |
| 2005/0219117 | A1 * | 10/2005 | Hiromori | G01S 7/4004 |
| | | | | 342/165 |
| 2009/0130981 | A1 * | 5/2009 | Nagai | G06K 19/0723 |
| | | | | 455/63.1 |
| 2015/0134250 | A1 * | 5/2015 | Lee | G01S 13/951 |
| | | | | 702/3 |
| 2016/0295590 | A1 * | 10/2016 | Arai | H04W 72/0453 |
| 2018/0007655 | A1 * | 1/2018 | Raghupathy | G01S 19/11 |
| 2018/0122128 | A1 * | 5/2018 | Crowley | G06T 11/206 |

OTHER PUBLICATIONS

Christopher L. Yatrakis "Computing the Cross Ambiguity Function—A Review" M.S. Thesis Binghamton University, State University of New York (Year: 2005).*

Douglas J. Nelson *, David C. Smith "Scale cross-ambiguity and target resolution" Digital Signal Processing 19 (2009) 194-200 (Year: 2009).*

Wei Xia et al. "A noise-constrained distributed adaptive direct position determination algorithm" in Signal Processing 135 (2017) p. 9-16; (Year: 2017).*

Christopher L. Yatrakis "Computing the Cross Ambiguity Function—A Review", THESIS Submitted in partial fulfillment of the requirements for the degree of Master of Science of Electrical Engineering Binghamton University, State University of New York, 2005, 131 pages (Year: 2005).*

Douglas J. Nelson, David C. Smith "Scale cross-ambiguity and target resolution" in Digital Signal Processing 19 (2009) p. 194-200. (Year: 2009).*

* cited by examiner $$A = \begin{bmatrix} v \\ u_{11} \\ u_{12} \\ \circ \\ \circ \\ \circ \\ u_{mn} \end{bmatrix}$$

$$u_{mn}(k) = v_{ref}(k-T_n/f\_s)e^{i2\pi(fm)}$$

$$R = AA^H$$

$$W = \frac{R^{-1}a}{a^H R^{-1}a'} \qquad a = \begin{bmatrix} 1 \\ 0 \\ 0 \\ \circ \\ \circ \\ \circ \\ 0 \end{bmatrix}$$

$$\acute{v} = W^H A$$

FIG. 5

REMOVAL OF DIRECTWAVE HIGH FREQUENCY SIGNAL FOR IONOSPHERIC SOUNDER RETURN PROCESSING

GOVERNMENT RIGHTS

This invention was made with government support under Contract No. FA865016C9104 awarded by the United States Air Force. The government has certain rights in the invention.

TECHNICAL FIELD OF THE INVENTION

This invention relates to ionospheric sounders, and more particularly to removing the directwave component of the signal received at the receiver of a vertical incidence sounder.

BACKGROUND OF THE INVENTION

The Earth's ionospheric layers are ionized layers that typically exist 100 km to 700 km above the Earth's surface. These ionospheric layers refract or reflect radio frequency signals in the nominally 2 MHz to 16 MHz frequency range. By measuring the time it takes for a signal transmitted from the ground to be reflected back to the ground, it is possible to compute the virtual height of the ionosphere. The virtual height of the ionosphere is equal to one-half the time it takes for a transmitted signal to make a round trip path divided by the speed of light.

A vertical incidence ionospheric sounder is one type of instrument for measuring the virtual height of the ionospheric layers. Vertical incidence sounders use a co-located transmitter and receiver, and involves directing a range of frequencies vertically to the ionosphere and measuring the values of the reflected returned signals to determine the effective ionosphere layer altitude. Conventionally, there are at least three primary technologies used in constructing an ionospheric sounder: 1) pulsed, 2) pseudo-random modulated waveform, and 3) linear swept, frequency modulated continuous wave (FMCW).

All vertical incidence sounder techniques must function in the presence of the high level of the transmitted signal while detecting the much weaker level of the return signal. The unwanted component of the return signal is referred to as its "directwave" component.

To eliminate the directwave component of the returned signal, many iononspheric sounder technologies employ a transmit/receive (T/R) function. This T/R function switches off the transmitter when the receiver is active, and alternatively turns off the receiver when the transmitter is active. There is a significant penalty for using this approach—cutting both transmit and receive time in half results in a 6 dB of processing gain (or sensitivity) penalty.

Another problem with some vertical incidence sounders is susceptibility to local 50 or 60 Hz power line electromagnetic interference (EMI). These EMI signals can result in false ionospheric height measurements.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 5 illustrates the nulling step of FIG. 3.

DETAILED DESCRIPTION OF THE INVENTION

The following description is directed to a vertical incidence ionospheric sounder that has processing for removing the unwanted direct wave component from the return signal. As explained below, the time of transmission of the direct wave is intrinsically measured. A novel signal nulling technique removes the direct wave component without the need for T/R switching or gating. This method simplifies the sounder hardware, and eliminates the processing gain penalty of conventional sounder designs.

The sounder may be operated at very low power levels (on the order of 10 milliwatts) as compared to the 10's or 100's of watts used by conventional sounders. It can be implemented using standard, off-the-shelf, software defined radio (SDR) HF transceiver hardware. Software-defined radio (SDR) is a radio communication system where components that have been traditionally implemented in hardware (e.g. mixers, filters, amplifiers, modulators/demodulators, detectors, etc.) are instead implemented by means of software on a personal computer or embedded processing system.

Figure 1:
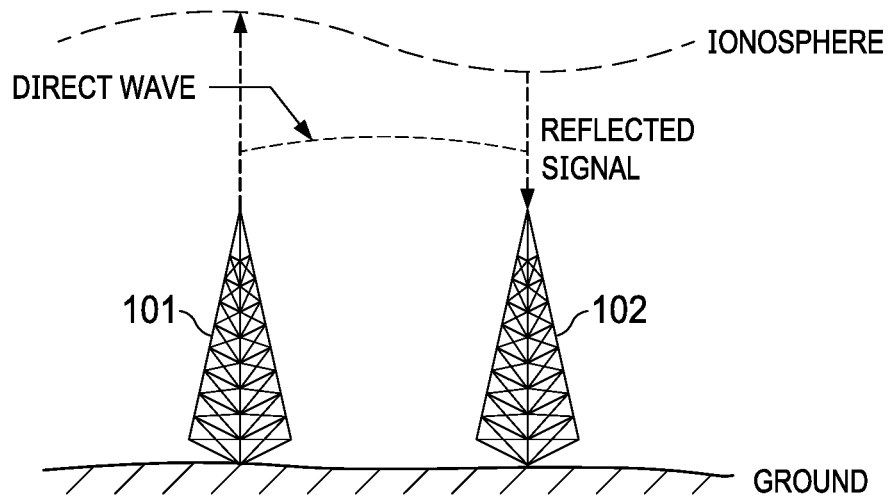
FIG. 1 illustrates the principle of operation of vertical incidence sounding.

FIG. 1 illustrates the principal of operation of a vertical incidence ionospheric sounder. As is conventional with such sounders, the transmitter antenna 101 and receiver antenna 102 are co-located. Vertical incidence ionospheric sounding can be compared to oblique incidence ionospheric sounding, where the transmitter and receiver antennae are separated to avoid overloading the receiver with the direct signal.

FIG. 1 further illustrates the directwave and reflected components of the received signal. A directwave is an electromagnetic wave that travels directly from a transmitting antenna to a receiving antenna along a straight line. Direct waves are responsible for part, but not all, of the signal propagation between two antennae when a sight line connecting the antennae lies above the ground. The directwave is also sometimes referred to as a line-of-sight wave or a space wave.

Figure 2:
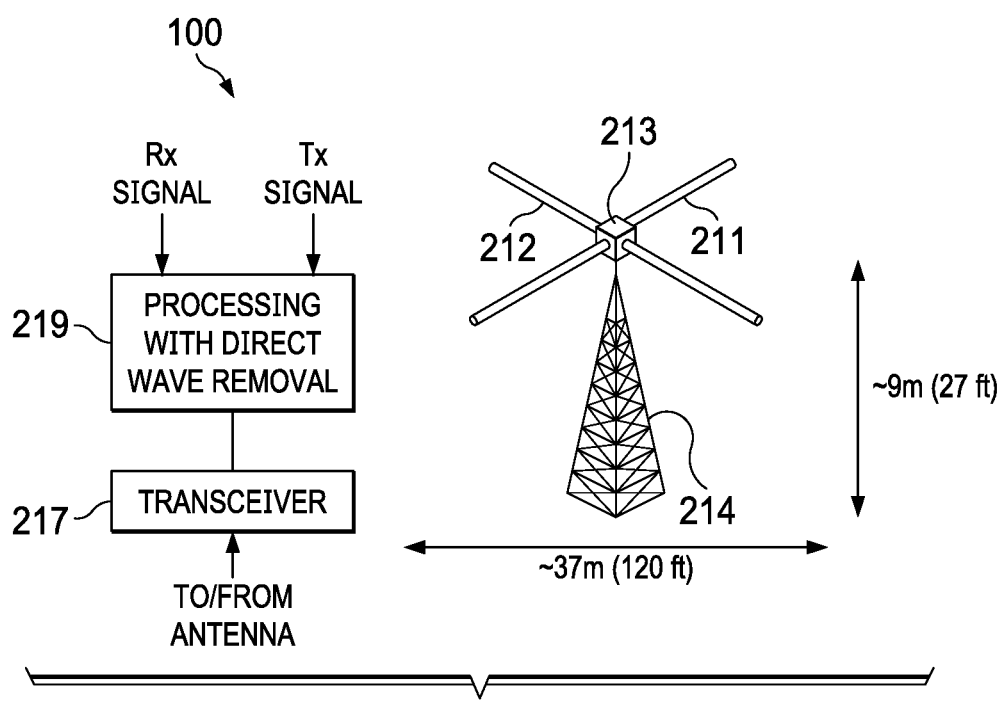
FIG. 2 illustrates a vertical incidence sounder system in accordance with the invention.

FIG. 2 illustrates the sounder system 100 of the present invention. The antenna system comprises two dipole antennas 201 and 202, a quadrature hybrid coupler 203, and a mast 204. The two antennas 201 and 202 are co-located, and are orthogonally oriented. An example of a suitable antenna length is approximately 120' long each. As is known in the art of antennas, a quadrature coupler is one in which the input is split into two signals that are 90 degrees apart in phase.

Transceiver 207 sends and receives sounding signals, as described below. Processing system 209 performs signal processing tasks, including removal of the directwave from the return signal, as described below.

Unlike conventional vertical incidence sounders, processing system 209 that does not use T/R switching. As stated in the Background, vertical incidence sounders conventionally avoid overloading their receiver with the unwanted direct signal by using T/R switching.

Processing system 209 is assumed to have appropriate processing hardware and software for performing the tasks described herein. Processing system 209 may be part of a more comprehensive sounder processing system for performing additional tasks related to ionospheric sounding.

Figure 3:
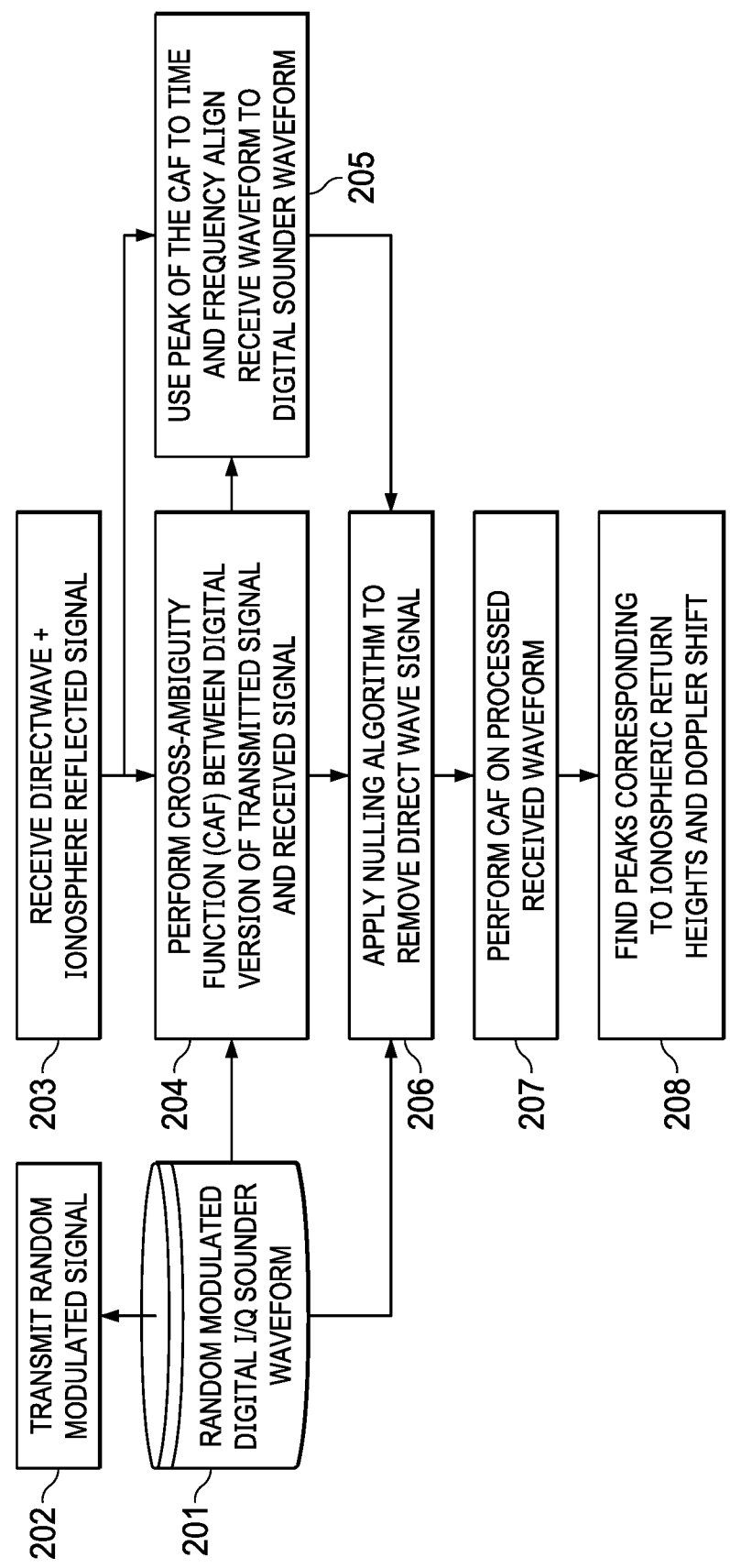
FIG. 3 illustrates a method of processing the received signal of a vertical incidence sounder to remove the directwave component.

FIG. 3 illustrates a method of processing the signal received at processing unit 209 to remove the directwave component of the received signal. As stated above, the method is performed with hardware and software that implements processing unit 209.

Step 201 is generating a random modulated digital I/Q sounder waveform. "Random modulation" is a known modulation technique, which creates a new signal from two other signals by the process of quadrature amplitude modulation. In "I/Q modulation", "I" is the "in-phase" component of the waveform and "Q" represents the quadrature component.

In Step 201, the generated waveform is a fixed frequency transmission that is transmitted for a short time. Then, another frequency is selected and transmitted, and so on. This signal is used herein as a reference signal during processing, and is thus referred to below as a "reference signal".

Step 202 is transmitting the random modulated signal generated in Step 201.

Step 203 is receiving the return signal. Prior to processing, the return signal comprises both the directwave component and the ionospheric reflected signal component.

Step 204 is digitizing both the transmitted (reference) signal and return signal, and performing a cross-ambiguity function between them. The digitized data from these signals, respectively, may be referred to as the "reference data" and the "collected data" for processing purposes.

Step 205 is determining the peak value of the cross-ambiguity function. This peak value is used to time and frequency align the return waveform received in Step 203 with the reference waveform generated in Step 201. For frequency alignment, the collected data is mixed by the frequency of the peak to remove the frequency offset relative to the reference data. The frequency-adjusted data is aligned in time. The result is the best estimate of the time offset of the directwave.

Step 206 is applying a nulling process to remove the directwave signal from the return waveform as aligned in Step 205. The directwave signal is canceled from the collected data across time and frequency dimensions.

Step 207 is performing a cross-ambiguity process between the waveform resulting from Step 206 (the return signal after nulling the directwave component) and the reference waveform. To remove unwanted correlation artifacts, the negative cross-ambiguity plane is subtracted from the positive plane.

Step 208 is finding peaks in data resulting from Step 207 that are above desired thresholds and are within expected time delays. The expected time delays are those that correspond to 100-700 kilometer heights. These results correspond to ionospheric return heights and Doppler shift.

Figure 4:
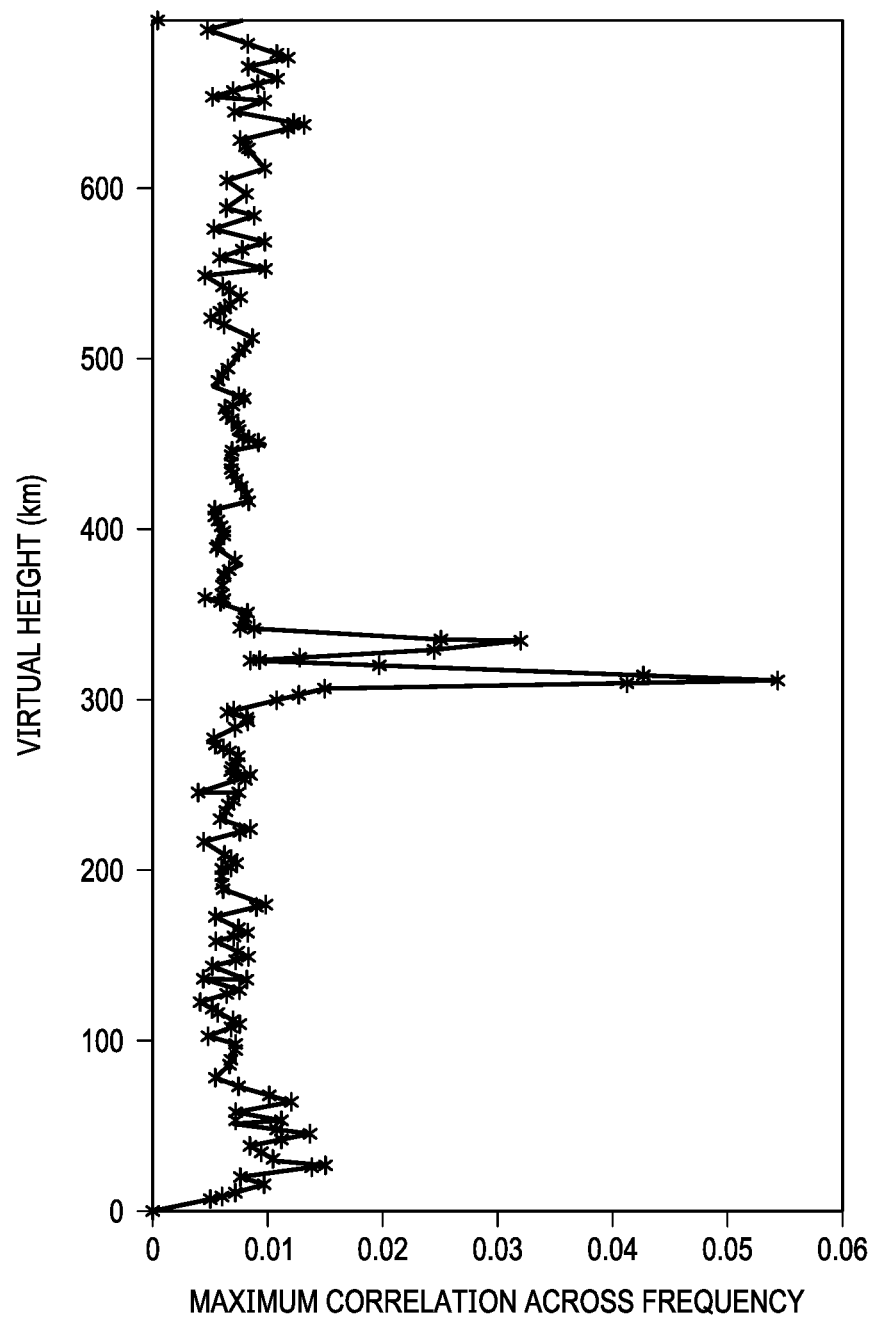
FIG. 4 illustrates the peak-finding step of the method of FIG. 3.

FIG. 4 illustrates the highest peak resulting from the cross-ambiguity process in Step 208. The cross-ambiguity process evaluates both time and frequency offsets when calculating correlation values. The time offset determines the ionospheric reflection height or heights. The frequency offset is a Doppler shift that is imposed on the refracted signal due to wave motion in the ionosphere. The notation "maximum correlation across frequency" means that maximum values of all Doppler measurements are taken for each time delay point.

FIG. 5 illustrates the nulling process of Step 206. The v values represent the measured waveform, mixed and time-aligned via the reference waveform. The values $u_{mn}$ represent reference waveforms mixed and delayed at various local time and frequency shifts, intended to nullify any extra energy seen via discretization of time and frequency.

Thus, the vector A is a time-varying vector of measured and reference waveforms, and when all time samples are collected, the result is a matrix A.

The matrix R is a correlation (covariance) matrix between the measured waveform and reference waveforms.

The vector a is a constraint vector, which forces nulling of all reference waveform energy matching the $u_{mn}$ references.

The vector W is a normalized weight vector, which is used to optimally combine the measured and reference waveforms to remove energy matching the reference waveforms.

The values $\dot{v} = W^H A$ represent the subsequent signal with all localized reference waveform energy removed. These values contain the weak returned reference signal, as it does not match the filtered versions.

What is claimed is:

1. A method of operating a vertical incidence sounder to remove a directwave component of a return signal, comprising:
    generating a random modulated digital I/O sounder waveform by creating a new signal from two other signals by the process of quadrature amplitude modulation, where I is an in-phase component of the waveform and Q is the quadrature component;
    transmitting a random modulated transmitted signal at a first frequency based on the sounder waveform;
    repeating the transmitting step for a number of frequencies;
    wherein the transmitting signal is to be further processed as a reference signal;
    receiving the return signal, comprising the directwave component and a reflected component;
    performing a first cross-ambiguity process between the reference signal and the return signal;
    using a first peak value from the results of the first cross-ambiguity process to time and frequency align the return signal with the reference signal;
    using a nulling process to remove the direct wave component from the return signal as aligned in the preceding step, thereby producing a processed return signal;
    performing a second cross-ambiguity process between the reference signal and the processed return signal; and
    using a second peak value from the result of the second cross-ambiguity process to determine a time offset; and
    using the time offset to determine an ionospheric height.

2. The method of claim 1, further comprising the steps of using the second peak value to determine a frequency offset, and using the frequency offset to determine a Doppler shift.

3. The method of claim 1, wherein the step of using a second peak value to determine a time offset is performed by determining peaks above a predetermined time delay threshold.

4. The method of claim 3, wherein the time delays correspond to 100 to 700 kilometer heights.

5. A vertical incidence sounder, comprising:
    two dipole antennas;
    a signal generator for generating a random modulated digital I/Q sounder waveform by creating a new signal from two other signals by the process of quadrature amplitude modulation, where I is an in-phase component of the waveform and Q is the quadrature component;

a transceiver for transmitting and receiving a transmit signal and a return signal, the return signal having a directwave component and a reflected component;

wherein the transmitting step is performed by transmitting the random modulated digital I/Q sounder waveform at a first frequency based on the sounder waveform and repeating the transmitting step for a number of frequencies;

a direct wave removal processor for performing the following tasks: receiving the return signal; performing a first cross-ambiguity process between the transmitted signal and the return signal; using a first peak value from the results of the first cross-ambiguity process to time and frequency align the return signal with the transmitted signal; using a nulling process to remove the direct wave component from the return signal as aligned in the preceding step, thereby producing a processed return signal; performing a second cross-ambiguity process between the transmitted signal and the processed return signal; and using a second peak value from the result of the second cross-ambiguity process to determine a time offset; and using the time offset to determine an ionospheric height.

6. The sounder of claim 5, wherein the direct wave removal process further uses the second peak value to determine a frequency offset, and using the frequency offset to determine a Doppler shift.

7. The sounder of claim 5, wherein using a second peak value to determine a time offset is performed by determining peaks above a predetermined time delay threshold.

8. The sounder of claim 7, wherein the time delays correspond to 100 to 700 kilometer heights.

* * * * *